United States Patent [19]
Wilson

[11] Patent Number: 5,443,885
[45] Date of Patent: Aug. 22, 1995

[54] FLOOR AND COUNTERTOP PROTECTOR PAD

[76] Inventor: Roger D. Wilson, 10635 Winterhawk, Boise, Id. 83709

[21] Appl. No.: 45,517

[22] Filed: Apr. 8, 1993

[51] Int. Cl.$^6$ .................. B32B 3/26; B32B 23/02
[52] U.S. Cl. .................. 428/121; 428/156; 428/158; 428/192; 428/212; 428/213; 428/304.4; 428/314.4; 428/315.7; 428/319.3
[58] Field of Search .............. 428/121, 156, 158, 192, 428/212, 213, 304.4, 314.4, 315.7, 319.3

[56] References Cited

U.S. PATENT DOCUMENTS

| | | | |
|---|---|---|---|
| 1,926,429 | 9/1933 | Bendelari | 45/68.3 |
| 2,492,541 | 12/1949 | Stanitz | 311/106 |
| 2,760,895 | 8/1956 | Holgerson | 154/49 |
| 2,901,861 | 9/1959 | Oakes | 45/68.3 |
| 3,046,074 | 7/1962 | Lieber | 312/140.1 |
| 3,606,508 | 9/1971 | Burnes | 312/140.3 |
| 3,764,642 | 10/1973 | Boutillier | 264/47 |
| 3,823,047 | 7/1974 | Colombo | 156/322 |
| 3,915,528 | 10/1975 | Glickman | 312/229 |
| 4,107,247 | 8/1978 | Dukess | 264/45.9 |
| 4,377,614 | 3/1983 | Alfter et al. | 428/213 |
| 4,385,090 | 5/1983 | Sims | 428/314.4 |
| 4,674,245 | 6/1987 | Turner | 52/177 |
| 4,766,020 | 8/1988 | Ellingson, Jr. | 428/54 |
| 4,883,001 | 11/1989 | Roth | 108/90 |
| 5,100,716 | 3/1992 | Juneau | 428/167 |

Primary Examiner—George F. Lesmes
Assistant Examiner—Kathryne E. Shelborne
Attorney, Agent, or Firm—Ken J. Pedersen; Barbara S. Pedersen

[57] ABSTRACT

Various embodiments of a floor and countertop protector pad are shown and described, as well as the method of protecting a floor or countertop with the invented protector pad. The protector pad includes a barrier means that is a top layer of moisture-impermeable, and puncture-, tear-, and deformation-resistant high density polymeric film and a bottom layer of closed-cell polymeric foam bonded to the film. The film and foam thicknesses are selected to make the protector pad lightweight and easily rollable and unrollable into a flat and uncurled shape, while still performing the barrier and cushioning jobs. The film serves as the barrier to liquid spills and to gouging, scraping, or falling objects and deforms only slightly and in a shallow, spread-out manner. The foam efficiently adsorbs and dissipates the force of what little film deformation does occur and also lies over small debris and dirt on the floor or countertop to temporarily trap it and prevent it from being drug and scrapped along the floor or countertop.

5 Claims, 3 Drawing Sheets

FLOOR AND COUNTERTOP PROTECTOR PAD

BACKGROUND OF THE INVENTION

1. Technical Field

This invention relates to temporary covers for protecting floors and countertops from damage by falling or dragging objects, or by chemicals or paints, while work is being done on the interior of a building. Specifically, the invention relates to a multi-layered protective cover that can easily be rolled for transport and then easily unrolled for use.

2. Background Art

During the last stages of house or building construction, and after floor and countertop materials have already been installed, finish work such as painting, caulking, finish carpentry, and appliance and lighting fixture installation is done. This work often causes significant damage to plastic laminates, linoleum, hardwood, ceramic tiles, and carpets before the building is sold or moved into. Heavy tools, caulking and paint buckets, and appliance edges are particularly damaging. Sometimes additional damage is done because these objects, or the people using them, rest on or step on particulate such as dirt or gravel or on small objects such as nails or staples that lie on the floor or countertop. Often the particulate or small object gets dragged along or pushed into the floor or countertop, causing scratches and gouges.

Traditionally, the only protection, if any, given to floors and countertops during the final stages of construction has been a thin fabric drop cloth or a thin plastic sheet such as the 0.002 inch thick self-adhesive plastic sheet called Carpet Mask TM by Poly-Tak TM. These help protect against paint or caulking splatters and soil on workers' feet, but do not protect against gouges, scrapes, abrasion, or other damage and breakage due to impact of objects or feet.

Fabric throw rugs or moving-van style blankets could be used but these adsorb liquids, snag and catch on appliances, and do not protect against sharp and forceful impact. Also, these covers are bulky and heavy to transport and store.

Many floor covers and mats have been made in the past, but they are either too thick and bulky, too rigid, or not protective enough. Juneau (U.S. Pat. No. 5,100,716) discloses an outdoor floor covering having a ribbed top sheet of galvanized rubber at least 3 mm in thickness, and a bottom sheet of closed-cell material that is three or more times the thickness of the top sheet. Juneau teaches that both top and bottom sheets are easily deformable so that ice on top of the cover will break up when the cover is stepped on. Ellingson, Jr. (U.S. Pat. No. 4,766,020) teaches a plastic mat made of interconnected sections with openings between the sections through which dirt may fall to the floor. Holgerson (U.S. Pat. No. 2,760,895) discloses floor covering blocks with a rigid backing, middle cushion member, and a top tufted member. Turner (U.S. Pat. No. 4,674,245) discloses blocks for a roof walkway panel, having a foam bottom pad and a concrete upper section.

Many covers for tables or countertops have been made, but they are either too rigid, too permanent, or not protective enough for temporary use during finish work. Countertop designs include Burnes (U.S. Pat. No. 3,606,508), Lieber (U.S. Pat. No. 3,046,074), Oakes (U.S. Pat. No. 2,901,861), and Stanitz (U.S. Pat. No. 2,492,541). Retrofit covers for countertops or tables have been designed, such as the picnic table cover taught by Roth (U.S. Pat. No. 4,883,001) and the desk attachment taught by Glickman (U.S. Pat. No. 3,915,528), which both are rigid and held on by adhesives. Fabric table covers also have been designed, such as the elastic fabric cover taught by Bendelari (U.S. Pat. No. 1,926,429).

Voltek of Lawrence, Mass., makes an extrusion-coated composite material called Volextra TM for uses such as automobile interiors. Volextra TM includes a fine-celled, irradiation cross-linked polyolefin foam. The foam thickness to coating thickness ratio appears to typically be in the range of 4 to 35. It is suspected that the heat involved in the extrusion-coating process makes lower foam to film thickness ratios difficult to obtain.

What is still needed is a temporary cover for floors or countertops that provides a rugged, tough, liquid-proof, protective barrier but that also can easily be transported as a compact, lightweight package and can easily and quickly be installed for use.

DISCLOSURE OF INVENTION

This invention is a protector pad for temporary placement on a floor or countertop and the method of protecting the floor or countertop with the protector pad. The protector pad includes a layer acting as a barrier means and a layer acting as a cushion means. The barrier means comprises a moisture-impermeable, deformation-, puncture-, and tear-resistant high density polymeric film sheet. The cushion means comprises a closed-cell polymeric foam sheet bonded to the film sheet. The protector pad is laid down with the foam contacting the floor or countertop horizontal surface, and the foam sheet deforms to lie over particulate or small objects such as staples or tacks mistakenly left on the horizontal surface. The film sheet resists deformation and remains intact when objects are dropped, scraped, or pushed into the protector pad. Whatever deformation of the film sheet does occur is cushioned and dissipated by the foam sheet.

The preferred protector pad has a film sheet thickness of 0.025 inches and a foam sheet thickness of 0.075 inches, while the protector pad apparatus invention includes film sheet thickness of 0.025 inches or less, and foam sheet thicknesses three or less times the thickness of the film sheet. Such protector pads are the preferred way of practicing the broader method of protecting a floor or countertop by using a protector pad made of layers of high-density polymeric film up to and including 0.025 inches thick and a closed-cell foam sheet up to and including 0.15 inches thick.

The protector pad provides excellent protection, while being extremely lightweight, rollable, and unrollable to a flat shape for quick use. The invented method of floor and countertop protection protects the horizontal surface from falling, scraping, and spilling objects above the pad and from the particulate and small objects lying below the pad.

BEST MODE FOR CARRYING OUT INVENTION

Figure 1:
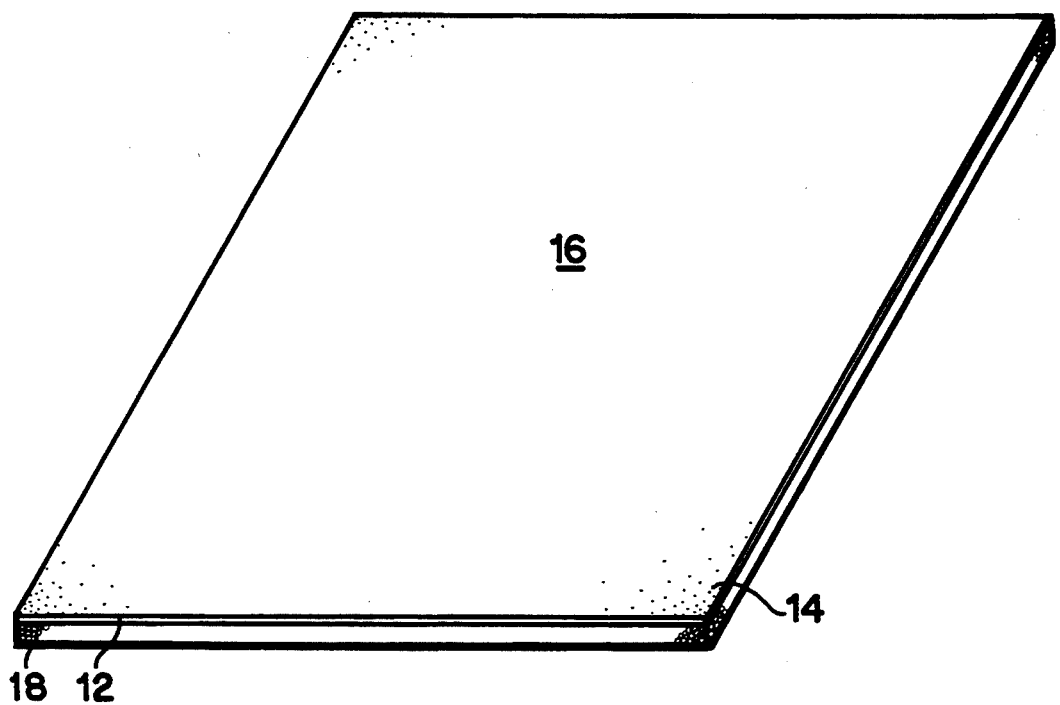
FIG. 1 is a perspective view of one embodiment of the invented protector pad, including a non-skid texture on the film sheet.
Figure 2:
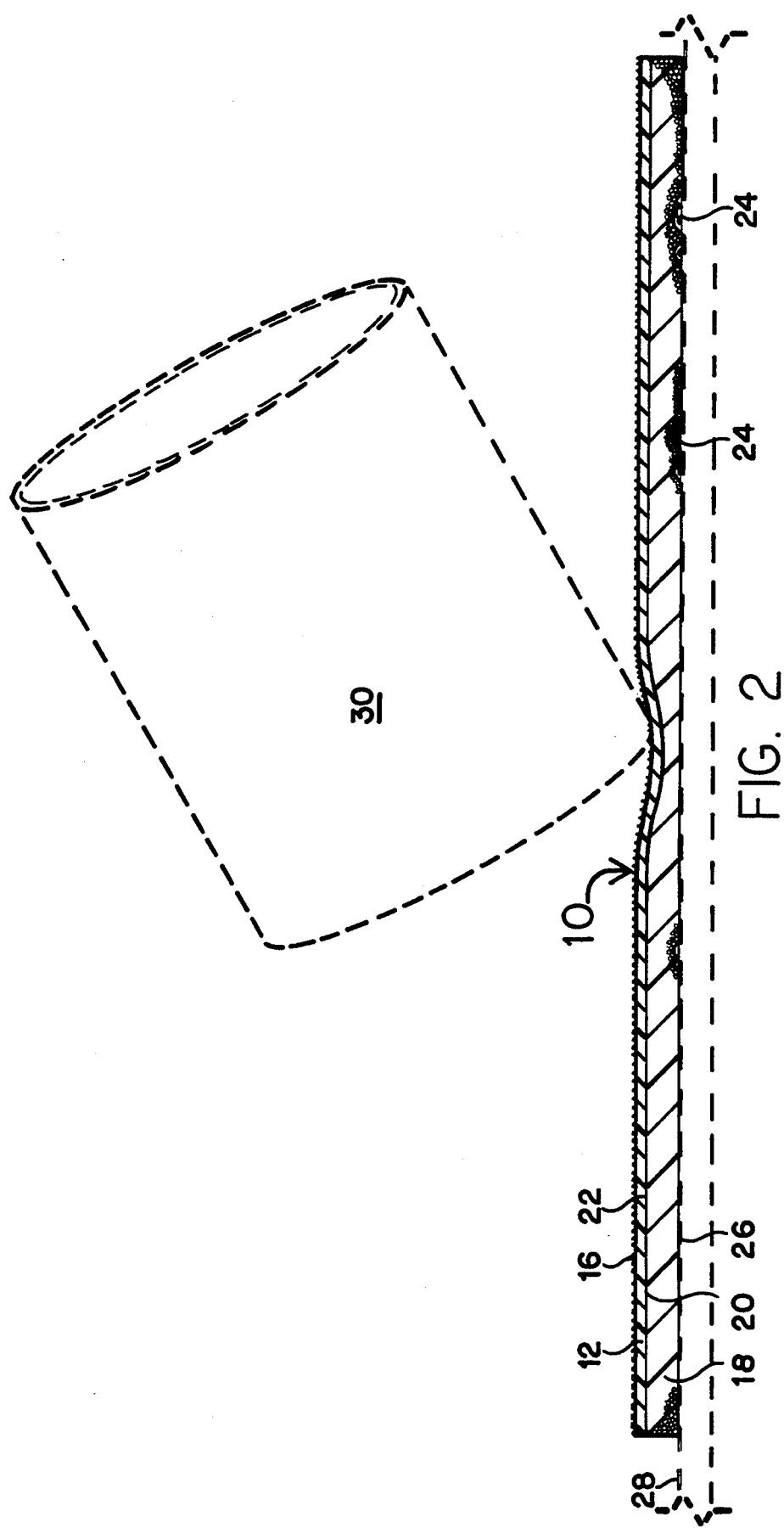
FIG. 2 is a front view of one embodiment of the invention, illustrating the trapping of small objects under the pad and the minimized and spread-out deformation of the film.
Figure 3:
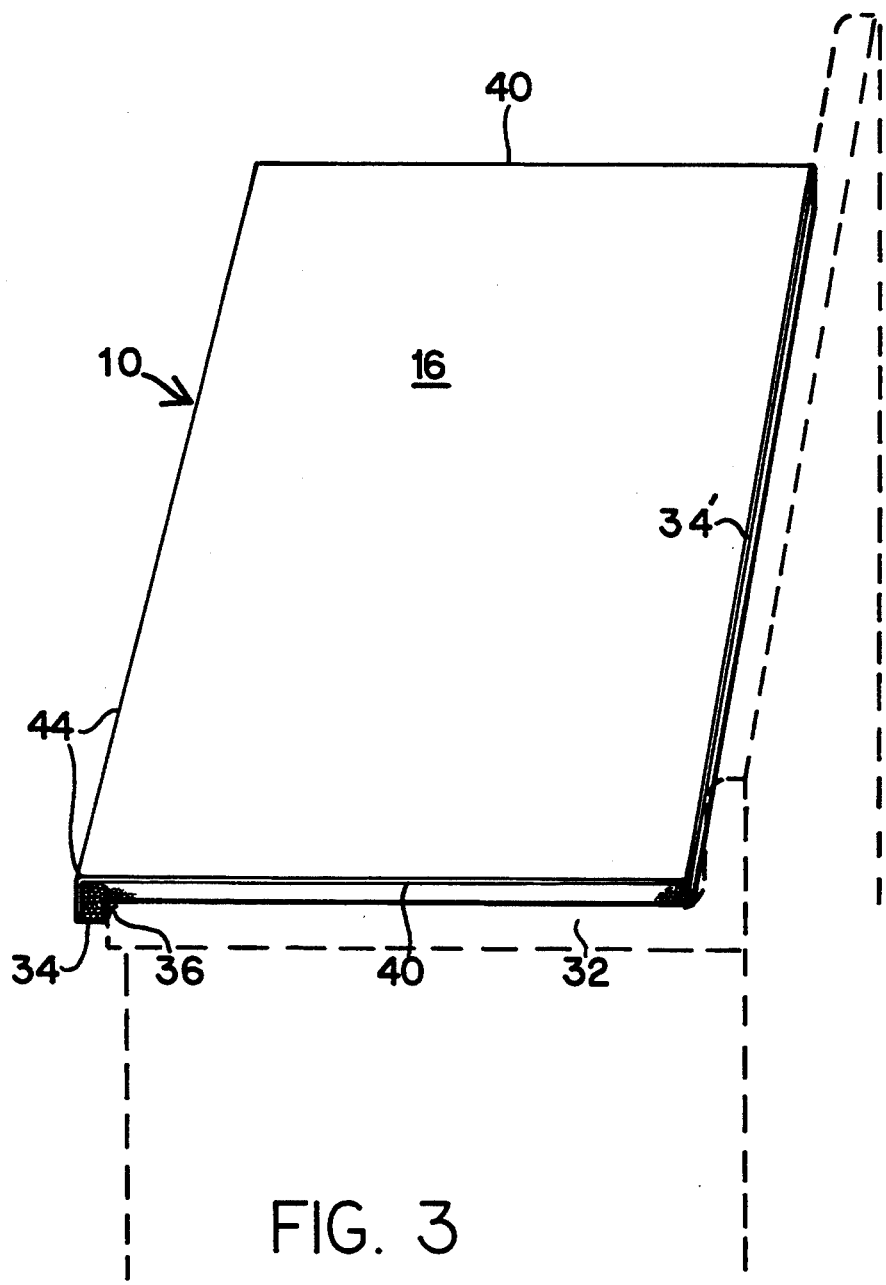
FIG. 3 is a perspective view of an embodiment of the invention for a countertop, including a crimped lip for protecting the countertop edge.

Referring to FIGS. 1–3, there are shown several, but not the only, embodiments and methods of using the floor and countertop protector pad 10.

The protector pad 10 includes a high-density polymeric film sheet 12 of 0.025 inches or less, with the properties of tear-resistance, puncture-resistance, deformation-resistance, moisture-impermeability, and rollability and unrollability. A polyethylene, polypropylene, or ABS plastic would be suitable. Optionally, a non-skid texture 14 such as a gritty or knobby texture may be added to the upper surface 16 of the film sheet 12 during or after the manufacture of the film sheet 12.

The protector pad 10 also includes a polymeric foam sheet 18 that is closed-cell and has a thickness of three or less times the film sheet. After manufacture of the film and foam sheets 12, 18, the top surface 20 of the foam sheet 18 is bonded to the lower surface 22 of the film sheet 12 with a mastic or solvent-based adhesive such as contact cement. Or, the foam sheet 18 may be made in place on the lower surface 22 of the film sheet 12 from a liquid precursor, for example, which is distributed over the lower surface 22. Or, the foam sheet 18 may be thermally bonded by flame bonding, for example, to the lower surface 22 of the film sheet 12.

The foam sheet 18 serves several purposes. First, it traps dirt, particulate and small pieces of construction debris, such as staples or tacks, between the bottom surface 26 of the foam sheet 18 and the horizontal surface 28. The foam sheet 18 deforms around these objects 24 and holds them in place relative to the horizontal surface 28 to keep them from scratching and gouging the floor or countertop as workers stand on the protector pad. The foam sheet 18 holds the protector pad 10 in place without having a tacky or especially rough bottom surface 56. Preferably, the bottom surface 26 is not tacky, so that it does not pick up and hold dirt when the protector pad 10 is rolled and put away. Second, the foam sheet 18 cushions whatever deformation force does come through the film sheet 12. The closed foam cells act as resilient cushions that dissipate forces with only a slight amount of foam sheet 18 deformation. Thus, heavy objects 30 cause only shallow and spread-out deformation of the film sheet 12 and of the foam sheet 18, and do not damage the floor or countertop.

The combination of film sheet 12 and foam sheet 18 allows surprisingly thin layers to have excellent protective features. Consequently, the thinness results in a surprisingly lightweight and surprisingly rollable and unrollable protector pad 10. The user easily carries the protector pad 10 with him or her, and quickly unrolls it with a flick of the wrist, which greatly enhances the usability and practicality of the protector pad 10. Although the new protector pad 10 apparatus includes film sheets 12 of 0.025 inches or less thickness and foam sheets 18 of three or less times the thickness of the film, the preferred protector pad has about a 0.025 inch thick film sheet 12 and about a 0.075 inch thick foam sheet 18, which give a combination of excellent protection and yet also excellent unrollability and lightness of weight.

Preferably, the film sheet 12 is a high density polyethylene such as the plastic slip sheets or Bestflex ™ plastic sheeting manufactured by Baron Industries, Inc. of Denver, Colo. One such Baron slip sheet product is characterized by a Rockwell Hardness of R65, a Vicat softening point of 295° F. continuous resistance to heat=240° F. tensile strength at yield in excess of 3300 pounds per square inch, no moisture adsorption, no promotion or breeding of fungi or bacterial growth, and resistance to damage by most solvents and chemicals.

Preferably, the foam sheet 18 is expanded polyethylene closed cell foam, of between about 1.5 to 1.9 pounds per cubic foot density (#). Dow Ethafoam ™ 1.7 # polyethylene foam has been successfully used.

For protection of a countertop 32 and especially of the vulnerable countertop edge, the protector pad 10 may be crimped or otherwise bent along a side edge 34 to form a lip 36 for hanging down over the edge 38. Preferably, the pad for this use is a rectangle with two end edges 40 and two side edges 34, 34' and the crimp 44 is near a side edge 34 running along the length between the end edges 40.

This invention includes the method of using the protector pad as an easily rollable and unrollable and yet extremely tough unit for protecting a floor or countertop. As with the apparatus, the method requires that the film sheet 12 and foam sheet 18 combination be thin enough and flexible enough to be rolled without creasing and to be unrolled to a flat shape, while also being tough enough and cushioning enough to fulfill the barrier and cushioning requirements. This method includes the use of the invented protector pad 10 apparatus and also protector pads with slightly thicker closed-cell foam sheets up to about 0.15 inches in thickness. Although somewhat heavier and less flexible for rolling and unrolling, the protector pads with foam sheet thickness greater than 0.075 up to 0.15 inch still give acceptable performance and so are included in the protection method.

Experimentation has shown that a pad with a film sheet 12 thickness of 0.03 inches and a foam sheet 18 thickness of either approximately 0.125 or 0.25 inches gave inferior unrollability, as did a pad with a film sheet 12 thickness of 0.025 inches and a foam sheet 18 thickness of 0.25 inches. After several hours of being rolled up in a cylindrical shape, these pads with increased film thickness and/or foam thickness stayed curled or slightly curled instead of lying flat on a horizontal surface.

While there is shown and described the present preferred embodiment of the invention, it is to be distinctly understood that this invention is not limited thereto but may be variously embodied to practice within the scope of the following claims.

I claim:

1. A floor and countertop protector pad for temporarily covering and protecting a building interior horizontal surface from damage by liquids, by falling, scraping, and gouging objects, and by particulate and small objects lying on the horizontal surface, the protector pad consisting of:
    a barrier means comprising a moisture-impermeable and deformation-, puncture-, and tear-resistant high density polymeric film sheet having an upper surface and a lower surface, and having a thickness of 0.025 inches or less, and
    a cushion means comprising a closed-cell polymeric foam sheet having a top surface bonded to the lower surface of the film sheet for resiliently deforming to dissipate the forces of said falling, scraping, and gouging objects impacting on the film sheet, and the foam sheet having a bottom surface for placement on the horizontal surface and for resiliently deforming to lie over the said particulate and small objects, wherein the foam sheet has a thickness less than three times the thickness of the film sheet, and wherein the protector pad is flexible for rolling for transport and for unrolling flat to contact the horizontal surface.

2. A floor and countertop protector pad as set forth in claim 1, wherein the protector pad is rectangular in shape and has two end edges and two side edges, and the protector pad is crimped along the length of the protector pad to form a lip along a side edge for hanging down over and protecting a countertop edge.

3. A floor and countertop-protector pad as set forth in claim 1, wherein the film sheet is made of high density polyethylene.

4. A floor and countertop protector pad as set forth in claim 1, wherein the foam sheet is expanded polyethylene foam.

5. A floor and countertop protector pad as set forth in claim 4, wherein the polyethylene foam has a density of 1.5 to 1.9 pounds per cubic foot.

* * * * *